United States Patent
Liao et al.

(10) Patent No.: US 12,435,862 B2
(45) Date of Patent: Oct. 7, 2025

(54) ILLUMINATION DEVICE

(71) Applicant: CHAMP VISION DISPLAY INC., Miao-Li County (TW)

(72) Inventors: Chun-Chien Liao, Miao-Li County (TW); Chin-Ku Liu, Miao-Li County (TW); Hsin-Hung Lee, Miao-Li County (TW); Kuo-Lung Lin, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 0 days.

(21) Appl. No.: 18/912,663

(22) Filed: Oct. 11, 2024

(65) Prior Publication Data

US 2025/0122991 A1     Apr. 17, 2025

(30) Foreign Application Priority Data

Oct. 13, 2023   (CN) .......................... 202311324928.0

(51) Int. Cl.
*F21V 7/00* (2006.01)
*F21V 3/02* (2006.01)
(Continued)

(52) U.S. Cl.
CPC .............. *F21V 7/0016* (2013.01); *F21V 3/02* (2013.01); *F21V 19/003* (2013.01);
(Continued)

(58) Field of Classification Search
CPC ......... F21V 7/0016; F21V 3/02; F21V 19/003
See application file for complete search history.

(56) References Cited

U.S. PATENT DOCUMENTS 5,749,646 A * 5/1998 Brittell ...................... F21K 9/23
362/240
5,929,788 A * 7/1999 Vukosic ............... B60Q 1/2611
340/471
(Continued)

FOREIGN PATENT DOCUMENTS

| CN | 112113166 A | 12/2020 |
|---|---|---|
| CN | 114278894 A | 4/2022 |

(Continued)

OTHER PUBLICATIONS

The Non-Final Office Action, dated Oct. 31, 2024, in U.S. Appl. No. 18/402,771.

*Primary Examiner* — Christopher E Dunay

(57) ABSTRACT

An illumination device includes a housing, a first light-emitting element, a second light-emitting element, a substrate, and a reflector. The housing has a first light-outlet portion and a second light-outlet portion separated from each other. The first light-emitting element is disposed in the housing and suitable for emitting a first beam. The second light-emitting element is disposed in the housing and suitable for emitting a second beam emitted from the second light-outlet portion. The substrate is disposed in the housing and electrically connected to the first light-emitting element and the second light-emitting element. The reflector is disposed in the housing and located on a transmission path of the first beam. The reflector is suitable for reflecting the first beam to the first light-outlet portion.

13 Claims, 9 Drawing Sheets

(51) Int. Cl.
*F21V 19/00* (2006.01)
*F21Y 107/90* (2016.01)
*F21Y 113/00* (2016.01)
*F21Y 115/10* (2016.01)

(52) U.S. Cl.
CPC ....... *F21Y 2107/90* (2016.08); *F21Y 2113/00* (2013.01); *F21Y 2115/10* (2016.08)

(56) References Cited

U.S. PATENT DOCUMENTS

| | | |
|---|---|---|
| 2004/0246698 A1 | 12/2004 | Shimizu et al. |
| 2009/0002979 A1* | 1/2009 | Medendorp, Jr. ......... F21V 5/10 |
| | | 362/310 |
| 2011/0235318 A1* | 9/2011 | Simon ..................... F21K 9/275 |
| | | 362/225 |
| 2015/0185394 A1 | 7/2015 | Huang et al. |
| 2015/0338565 A1 | 11/2015 | Pao et al. |
| 2016/0348852 A1* | 12/2016 | Kaandorp ............... F21V 13/04 |
| 2018/0031208 A1* | 2/2018 | Bukkems ................ F21V 14/02 |
| 2021/0333826 A1 | 10/2021 | Liao et al. |
| 2024/0192434 A1 | 6/2024 | Lee et al. |

FOREIGN PATENT DOCUMENTS

| | | |
|---|---|---|
| CN | 218544118 U | 2/2023 |
| TW | 200823405 A | 6/2008 |
| TW | 202206863 A | 2/2022 |
| TW | 202219425 A | 5/2022 |
| TW | M634734 U | 12/2022 |
| TW | 202314342 A | 4/2023 |
| WO | 2011118536 A1 | 9/2011 |

* cited by examiner

ILLUMINATION DEVICE

CROSS-REFERENCE TO RELATED APPLICATION

This application claims the priority benefit of China application (No. 202311324928.0), filed on Oct. 13, 2023. The entirety of the above-mentioned patent application is hereby incorporated by reference herein and made a part of this specification.

TECHNICAL FIELD

The disclosure relates to an electronic device, and more particularly to an illumination device.

BACKGROUND

Illumination devices are widely used in various living places, and the appearance, light output angle, and other characteristics of each illumination device will change according to different purposes. For example, the illumination devices used for reading can roughly include desk lamps, floor lamps, and screen mounted lamps. The screen mounted lamp is usually disposed at the upper edge of the screen to illuminate both the screen and the desktop. Compared to traditional desk lamps, screen mounted lamps can avoid the light directly transmitting on the screen and do not take up additional desktop space. In addition, the light emitted by the screen mounted lamp is less likely to be blocked by the user's body when the user uses the screen mounted lamp in a writing posture. Therefore, screen mounted lamps are increasingly favored by consumers in the market.

However, most of the conventional screen mounted lamps have drawbacks such as large volume, large weight, and complex structure, which lead to complex assembly and poor yield of the conventional screen mounted lamps, and subsequent maintenance costs are also difficult to reduce. In addition, the conventional screen mounted lamps can only emit towards the desktop, and the usage situation is relatively monotonous.

The information disclosed in this "BACKGROUND" section is only for enhancement understanding of the background and therefore it may contain information that does not form the prior art that is already known to a person of ordinary skill in the art. Furthermore, the information disclosed in this "BACKGROUND" section does not mean that one or more problems to be solved by one or more embodiments of the disclosure were acknowledged by a person of ordinary skill in the art.

SUMMARY

The disclosure provides an illumination device with the advantages of simple structure and diverse usage scenarios.

Other advantages and objectives of the disclosure may be further illustrated by the technical features broadly embodied and described as follows.

In order to achieve one or a portion of or all of the objectives or other objectives, the illumination device provided by the disclosure includes a housing, a first light-emitting element, a second light-emitting element, a substrate, and a reflector. The housing has a first light-outlet portion and a second light-outlet portion separated from each other. The first light-emitting element is disposed in the housing and suitable for emitting a first beam. The second light-emitting element is disposed in the housing and suitable for emitting a second beam emitted from the second light-outlet portion. The substrate is disposed in the housing and electrically connected to the first light-emitting element and the second light-emitting element. The reflector is disposed in the housing and located on a transmission path of the first beam. The reflector is suitable for reflecting the first beam to the first light-outlet portion.

The illumination device in this embodiment of the disclosure adopts a first light-emitting element and a second light-emitting element and guides the first beam and the second beam to respectively emit from the first light-outlet portion and the second light-outlet portion via the reflector. Therefore, because the illumination device can emit the first beam and the second beam in different directions, the first beam and/or the second beam can be provided according to different usage scenarios, thereby providing a variety of illumination modes. In addition, the illumination device of the disclosure adopts one substrate to electrically connect to the first light-emitting element and the second light-emitting element. Therefore, the illumination device saves at least one substrate, which can have the advantages of small volume, small weight, and simple structure.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the disclosure may be practiced. In this regard, directional terminology, such as "top", "bottom", "front", "back", etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
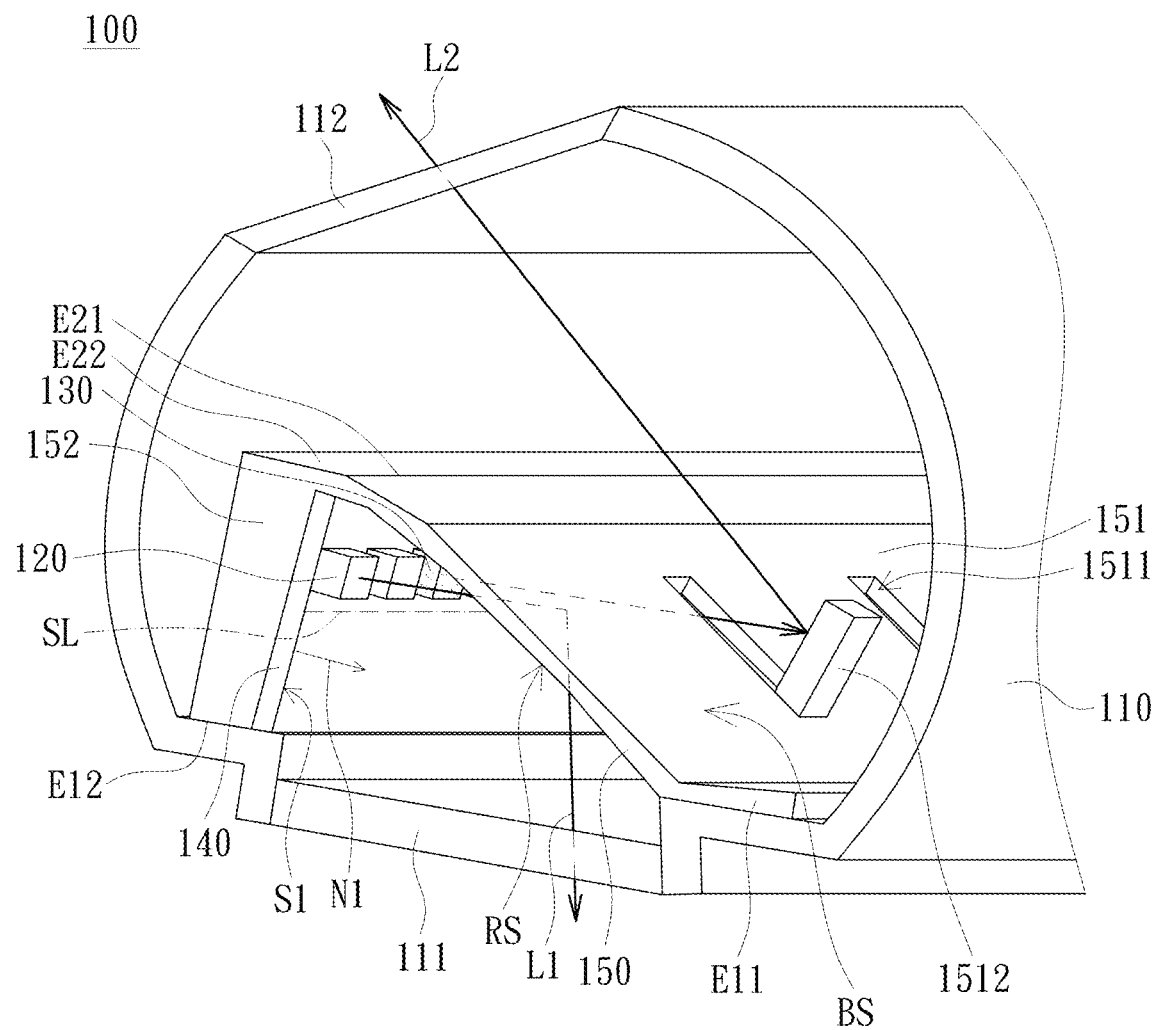
FIG. 1 is a schematic diagram of an illumination device according to an embodiment of the disclosure.
Figure 2:
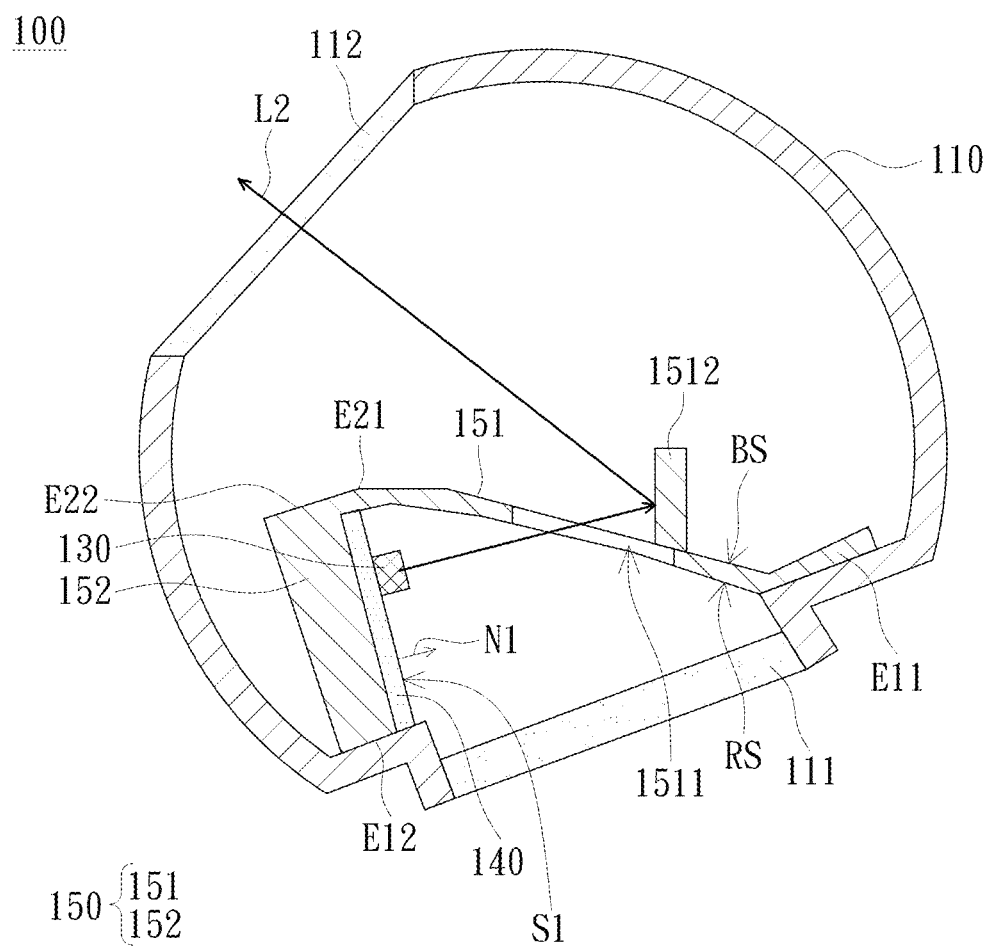
FIG. 2 is a schematic cross-sectional diagram of the illumination device shown in FIG. 1.

FIG. 1 is a schematic diagram of an illumination device according to an embodiment of the disclosure. FIG. 2 is a schematic cross-sectional diagram of the illumination device shown in FIG. 1. Please refer to FIGS. 1 and 2. The illumination device 100 includes a housing 110, a first light-emitting element 120 (shown in FIG. 1), a second light-emitting element 130, a substrate 140, and a reflector 150. The housing 110 has a first light-outlet portion 111 and a second light-outlet portion 112 separated from each other. The first light-emitting element 120 is disposed in the housing 110 and is suitable for emitting a first beam L1. The second light-emitting element 130 is disposed in the housing 110 and is suitable for emitting a second beam L2 emitted from the second light-outlet portion 112. The substrate 140 is disposed in the housing 110 and electrically connected to the first light-emitting element 120 and the second light-emitting element 130. The reflector 150 is disposed in the housing 110 and located on the transmission path of the first beam L1. The reflector 150 is suitable for reflecting the first beam L1 to the first light-outlet portion 111.

Figure 3:
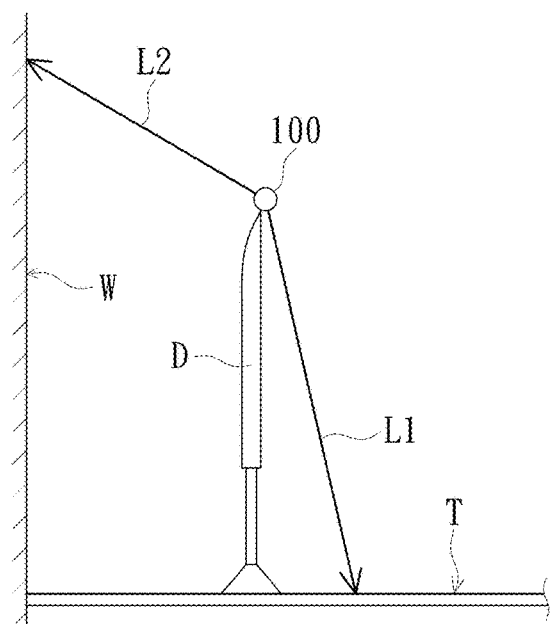
FIG. 3 is a schematic diagram of the usage scenario of the illumination device in FIG. 1.

FIG. 3 is a schematic diagram of the usage scenario of the illumination device in FIG. 1. Please continue to refer to FIG. 1 first. The first light-outlet portion 111 and the second light-outlet portion 112 of the housing 110 can allow the beam to pass therethrough, while the parts outside the first light-outlet portion 111 and the second light-outlet portion 112 of the housing 110 have a light-shading effect. Furthermore, the first light-outlet portion 111 and the second light-outlet portion 112 may be located on opposite sides of the housing 110 for the first beam L1 and the second beam L2 to exit from the housing 110 in different directions. Please refer to FIGS. 1 and 3 together. The illumination device 100 of this embodiment can be disposed, for example, at the upper edge of the display device D (shown in FIG. 3) as a screen mounted lamp, and therefore the first light-outlet portion 111 can face the desktop T for the first beam L1 to pass through and illuminate the desktop T. On the other hand, the second light-outlet portion 112 can face the wall W for the second beam L2 to pass through and illuminate the wall W. The first light-outlet portion 111 and the second light-outlet portion 112 include, for example, a light-transmitting plate. In one embodiment, the first light-outlet portion 111 and the second light-outlet portion 112 may have haze to provide a homogeneous light effect. In this embodiment, the shape of the housing 110 is, for example, cylindrical, but the disclosure does not impose further limitations on this. It can be understood that the use of the illumination device 100 is not limited to a screen mounted lamp in other embodiments, and the disclosure does not limit the specific use of the illumination device 100.

In this embodiment, the first light-emitting element 120 and the second light-emitting element 130 may include light-emitting diodes, but the disclosure is not limited to this. In addition, the colors of the first beam L1 and the second beam L2 in this embodiment may differ from each other. For example, the color of the first beam L1 may include white to provide illumination towards the desktop T for reading. On the other hand, the color of the second beam L2 may include red, green, and blue towards the wall W to provide decorative contextual beams. However, the disclosure does not impose any further restrictions on the colors of the first beam L1 and the second beam L2.

Please refer to FIGS. 1 and 2 again. The substrate 140 of this embodiment includes, for example, a circuit board. Specifically, the substrate 140 may include a printed circuit board, and the first light-emitting element 120 and the second light-emitting element 130 may receive power through the aforementioned printed circuit board to generate the first beam L1 and the second beam L2, respectively. Incidentally, the power source of the illumination device 100 may include a battery or socket, and the disclosure does not impose further limitations on this.

In this embodiment, the reflector 150 may be in a plate-shaped. Specifically, the reflector 150 has, for example, a first plate body 151 and a second plate body 152. The first end E11 of the first plate body 151 is disposed on the inner wall of the housing 110 adjacent to one side of the first light-outlet portion 111, and the first end E12 of the second plate body 152 is disposed on the inner wall of the housing 110 adjacent to another side of the first light-outlet portion 111. The second end E21 of the first plate body 151 is connected to the second end E22 of the second plate body 152. The first end E11 and the second end E21 are opposite to each other, and the first end E12 and the second end E22 are opposite to each other. Specifically, the reflector 150 is disposed between the first light-outlet portion 111 and the second light-outlet portion 112. The first plate body 151 is located on the transmission path of the first beam L1 and the second beam L2 to reflect the first beam L1 to the first light-outlet portion 111 and reflect the second beam L2 to the second light-outlet portion 112. Furthermore, the substrate 140 is disposed on the side of the second plate body 152 facing the first plate body 151. The substrate 140 has a first surface S1 facing the first plate body 151. The first light-emitting element 120 and the second light-emitting element 130 are fixed on the first surface S1. In this way, the first light-emitting element 120 can directly emit the first beam L1 towards the first plate body 151, while the second light-emitting element 130 can directly emit the second beam L2 towards the first plate body 151. On the other hand, the first plate body 151 reflects the first beam L1 to the first light-outlet portion 111 and reflects the second beam L2 to the second light-outlet portion 112.

In detail, the first plate body 151 may have a reflective surface RS, a back surface BS, a light-transmitting portion 1511, and a reflective portion 1512. The reflective surface RS is opposite to the back surface BS and faces the first surface S1 and the first light-outlet portion 111. The light-transmitting portion 1511 is communicated with the reflective surface RS and the back surface BS. The reflective portion 1512 stands on the back surface BS and is adjacent to the light-transmitting portion 1511. The reflective surface RS is suitable for reflecting the first beam L1 to the first light-outlet portion 111. The second beam L2 is transmitted to the reflective portion 1512 through the light-transmitting portion 1511. The reflective portion 1512 is suitable for reflecting the second beam L2 to the second light-outlet portion 112. In summary, the first light-emitting element 120 emits the first beam L1 towards the reflective surface RS, and the reflective surface RS reflects the first beam L1 to the first light-outlet portion 111. In addition, the second light-emitting element 130 emits the second beam L2 towards the light-transmitting portion 1511, and the second beam L2 is incident on the reflective portion 1512 after passing through the light-transmitting portion 1511 and is reflected by the reflective portion 1512 to the second light-outlet portion 112. In this embodiment, the reflective surface RS is, for example, an inclined plane relative to the first light-outlet portion 111. However, the reflective surface RS may include an arc-shaped surface or a plurality of inclined surfaces connected to each other in other embodiments, and the disclosure does not impose further limitations on this.

In this embodiment, the first surface S1 of the substrate 140 has a normal direction N1 pointing towards the first plate body 151. The second light-emitting element 130 is aligned with the light-transmitting portion 1511 in the normal direction N1, while the first light-emitting element 120 is misaligned with the light-transmitting portion 1511 in the normal direction N1. In this way, the light-transmitting portion 1511 is not only located on the transmission path of the second beam L2 but also can be prevented from being located on the transmission path of the first beam L1, thereby ensuring that the second beam L2 exits from the second light-outlet portion 112 and preventing the first beam L1 from exiting from the second light-outlet portion 112. In addition, because the first beam L1 can directly incident on the reflective surface RS after being emitted from the first light-emitting element 120, it can also improve the light utilization efficiency of the first beam L1. Similarly, because the second beam L2 can be directly incident on the light-transmitting portion 1511 after being emitted from the second light-emitting element 130, it can also improve the light utilization efficiency of the second beam L2. The light-transmitting portion 1511 of this embodiment includes, for example, a through hole, which can increase the brightness of the second beam L2 incident on the reflective portion 1512, thereby further improving the light utilization efficiency of the second beam L2. On the other hand, the first plate body 151 and the reflective portion 1512 can form an integrated structure. For example, the material of the first plate body 151 and the reflective portion 1512 may include metal, and the through hole and reflective portion 1512 may be formed in the first plate body 151 through the stamping process. However, the first plate body 151 and the reflective portion 1512 may form a separated structure in one embodiment, and the reflective portion 1512 may be fixed to the first plate body 151 by means of adhesion, screw locking, or mechanism engagement. It can be understood that the shape of the reflective portion 1512 is not limited to the shape shown in FIG. 1. For example, the reflective portion 1512 can be a cylinder or cone standing on the back surface BS. In addition, there may be no gap between the reflective portion 1512 and the light-transmitting portion 1511 as shown in FIG. 1, but the disclosure does not impose further limitations on this. In other words, there may be a gap between the reflective portion 1512 and the light-transmitting portion 1511 to further adjust the path of the second beam L2 reflected via the reflective portion 1512 to the second light-outlet portion 112.

Incidentally, the first light-emitting element 120 and the second light-emitting element 130 are arranged along a straight line SL (shown in FIG. 1) on the substrate 140 in this embodiment, but the disclosure is not limited to this. For example, the first light-emitting element 120 and the second light-emitting element 130 may be located on opposite sides of the straight line SL and thus arranged in a staggered manner in one embodiment.

Compared to the conventional technology, the illumination device 100 of this embodiment adopts a first light-emitting element 120 and a second light-emitting element 130 and guides the first beam L1 and the second beam L2 to respectively emit from the first light-outlet portion 111 and the second light-outlet portion 112 by the reflector 150. Therefore, because the illumination device 100 can emit the first beam L1 and the second beam L2 in different directions, the first beam L1 and/or the second beam L2 can be provided according to different usage scenarios, thereby providing a variety of illumination modes. In addition, the illumination device 100 of this embodiment adopts one substrate 140 to electrically connect to the first light-emitting element 120 and the second light-emitting element 130. Therefore, the illumination device 100 saves at least one substrate, which can have the advantages of small volume, small weight, and simple structure.

Figure 4:
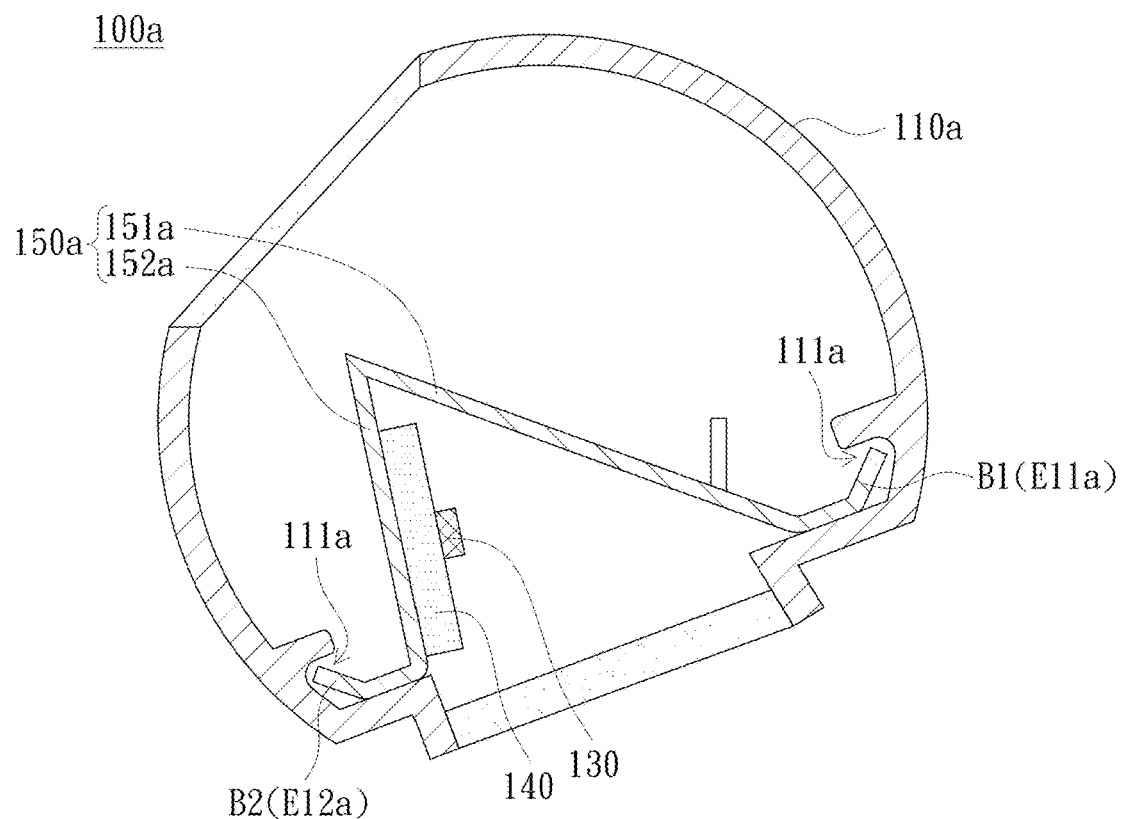
FIG. 4 is a schematic cross-sectional diagram of an illumination device in another embodiment of the disclosure.

Incidentally, please refer to FIG. 1 again. The first plate body 151 and the second plate body 152 can form an integrated structure, but other embodiments are not limited to this. In this embodiment, the first end E11 of the first plate body 151 and the first end E12 of the second plate body 152 can be fixed to the housing 110 by adhesive or screw locking, but the disclosure is not limited to this. For example, please refer to the illumination device 100a in FIG. 4. The housing 110a has, for example, a plurality of clamping mechanisms 111a, and the first end E11a of the first plate body 151a and the first end E12a of the second plate body 152a can be fixed in the clamping mechanisms 111a. Specifically, the clamping mechanism 111a is formed by extending the inner wall of the housing 110a, and the clamping mechanism 111a may include a groove. The first end E11a of the first plate body 151 and the first end E12a of the second plate body 152 may have a bending portion B1 and a bending portion B2 corresponding to the grooves, respectively. Therefore, the first plate body 151a and the second plate body 152a can be more firmly fixed in the groove by the bending portions B1 and B2. It can be understood that although the shape of the reflector 150a in FIG. 4 is different from that in the embodiment of FIG. 1, the disclosure does not impose additional limitations on the shape of the reflector 150a.

Figure 5:
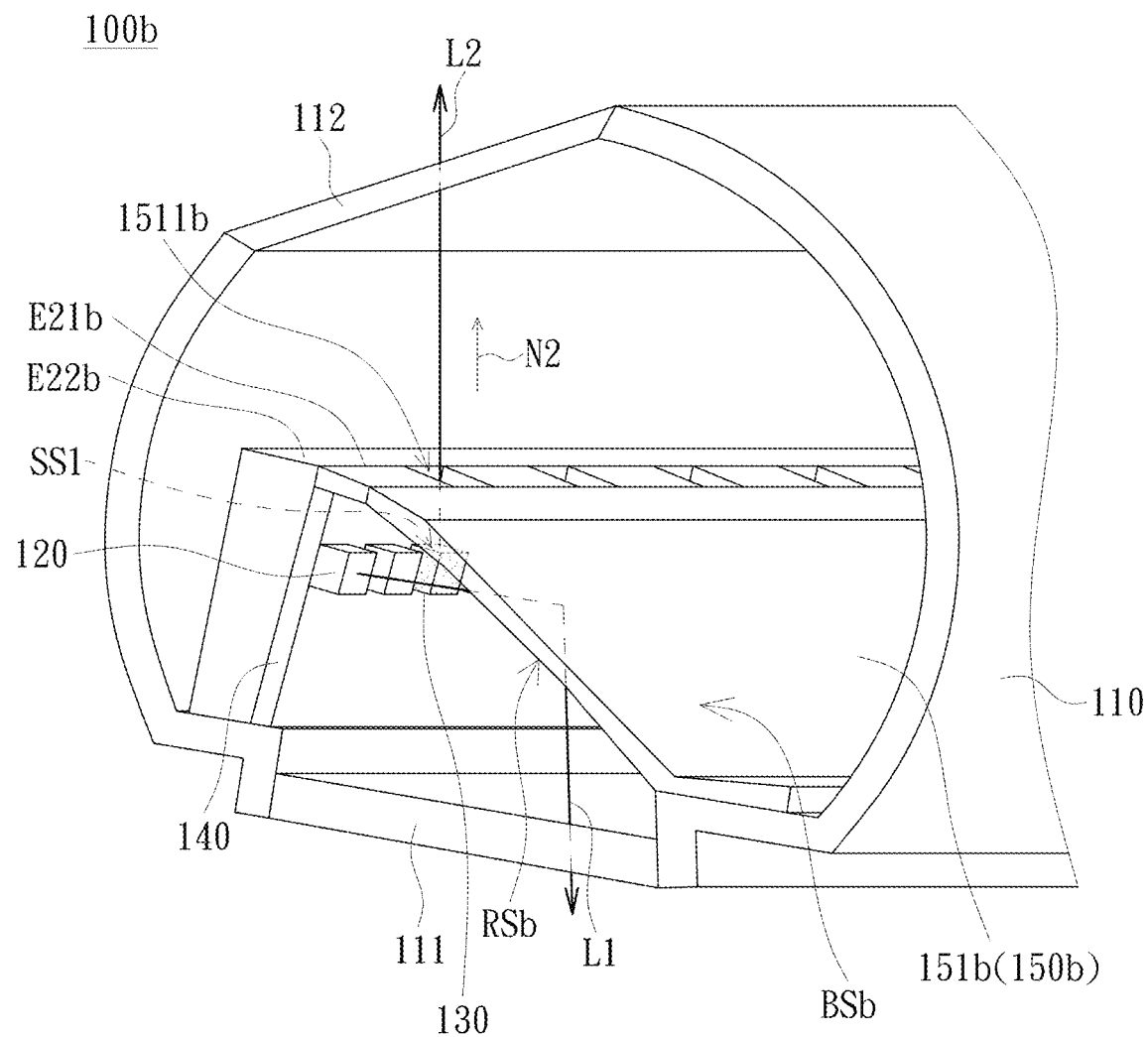
FIG. 5 is a schematic diagram of an illumination device in another embodiment of the disclosure.

FIG. 5 is a schematic diagram of an illumination device in another embodiment of the disclosure. The structure and advantages of the illumination device 100b in this embodiment are similar to those in the embodiment of FIG. 1, and only the differences are explained below. Please refer to FIG. 5. The first plate body 151b of the reflector 150b may have a reflective surface RSb, a back surface BSb, and a light-transmitting portion 1511b. The reflective surface RSb is opposite to the back surface BSb. The reflective surface RSb faces the first surface S1 and the first light-outlet portion 111. The light-transmitting portion 1511b is communicated with the reflective surface RSb and the back surface BSb. The light-transmitting portion 1511b is located between the second light-emitting element 130 and the second light-outlet portion 112. In this embodiment, the second light-emitting element 130 adopts a side-emitting LED, and the light-transmitting portion 1511b is located on the transmission path of the second beam L2. The reflective surface RSb is suitable for reflecting the first beam L1 to the first light-outlet portion 111. The second beam L2 is transmitted to the second light-outlet portion 112 through the light-transmitting portion 1511b. In this way, the second beam L2 is directly incident onto the second light-outlet portion 112 after passing through the light-transmitting portion 1511b, thereby improving the light utilization efficiency of the second beam L2. Specifically, the second end E21b of the first plate body 151b extends and is connected to the second end E22b of the second plate body 152, and the first light-outlet portion 111 and the second light-outlet portion 112 may be located on opposite sides of the second end E21b. The light-transmitting portion 1511b can be located at the second end E21b and is aligned with the second light-emitting element 130, thereby ensuring that the second beam L2 can be incident from the second light-emitting element 130 to the light-transmitting portion 1511b. Furthermore, the second light-emitting element 130 has a side surface SS1 facing the second end E21b, and the second beam L2 is emitted from the side surface SS1 of the second light-emitting element 130, while the light-transmitting portion 1511b is aligned with the second light-emitting element 130 in the normal direction N2 of the side surface SS1. In this embodiment, the light-transmitting portion 1511b may include a through hole to further improve the light utilization efficiency of the second beam L2, but other embodiments are not limited to this.

Figure 6:
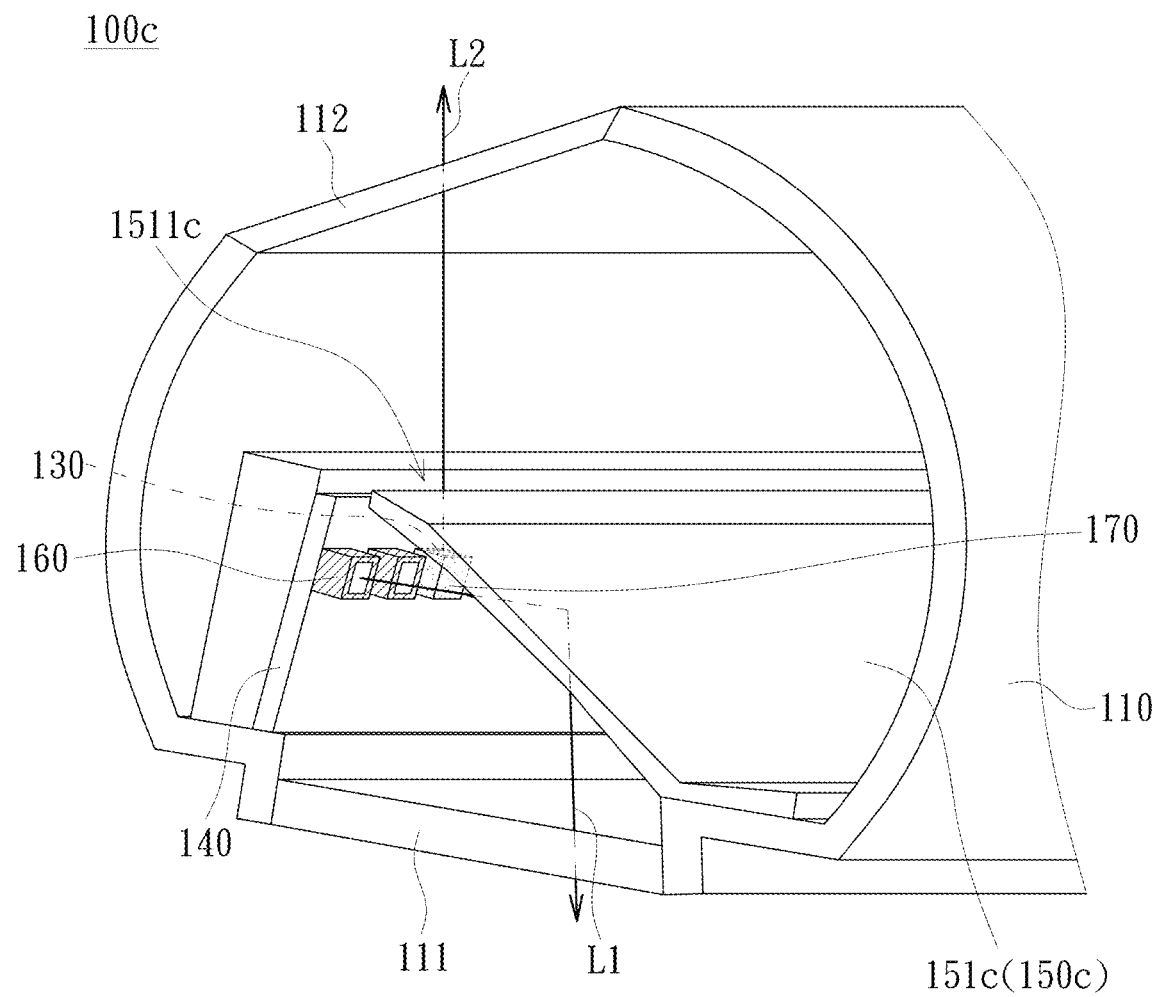
FIG. 6 is a schematic diagram of an illumination device in another embodiment of the disclosure.
Figure 7:
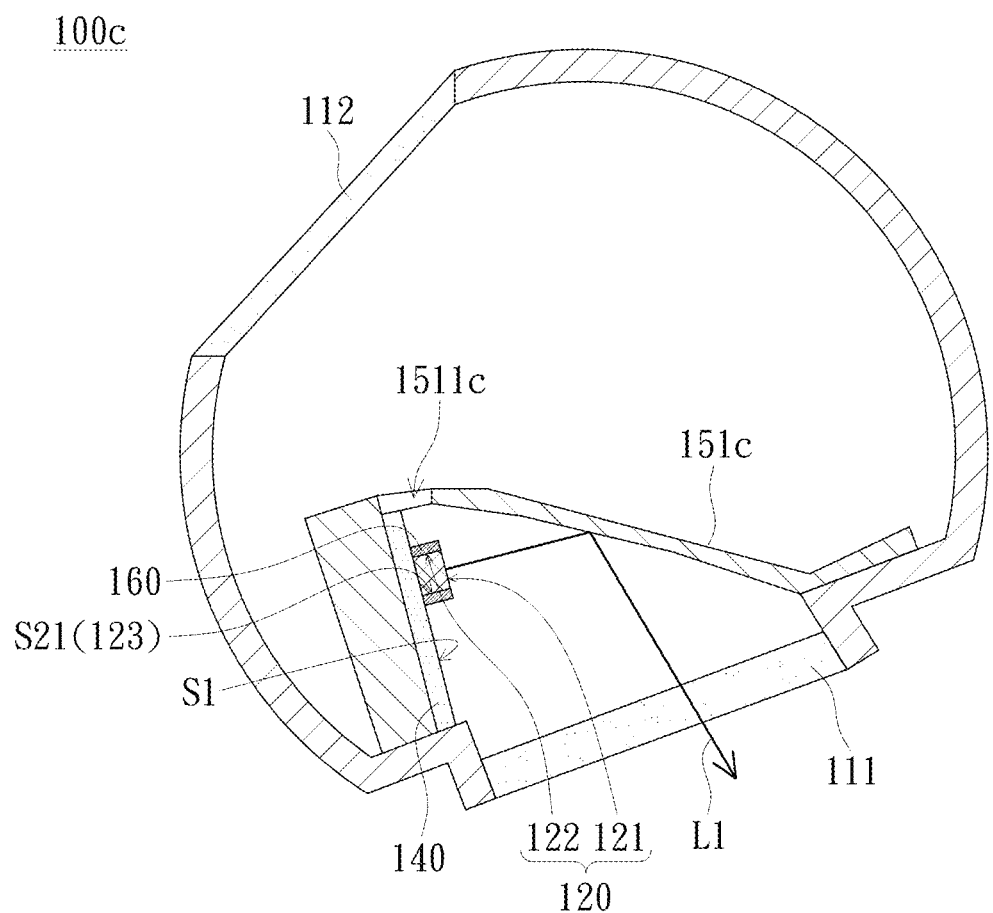
FIG. 7 is a schematic cross-sectional diagram of the illumination device shown in FIG. 6.
Figure 8:
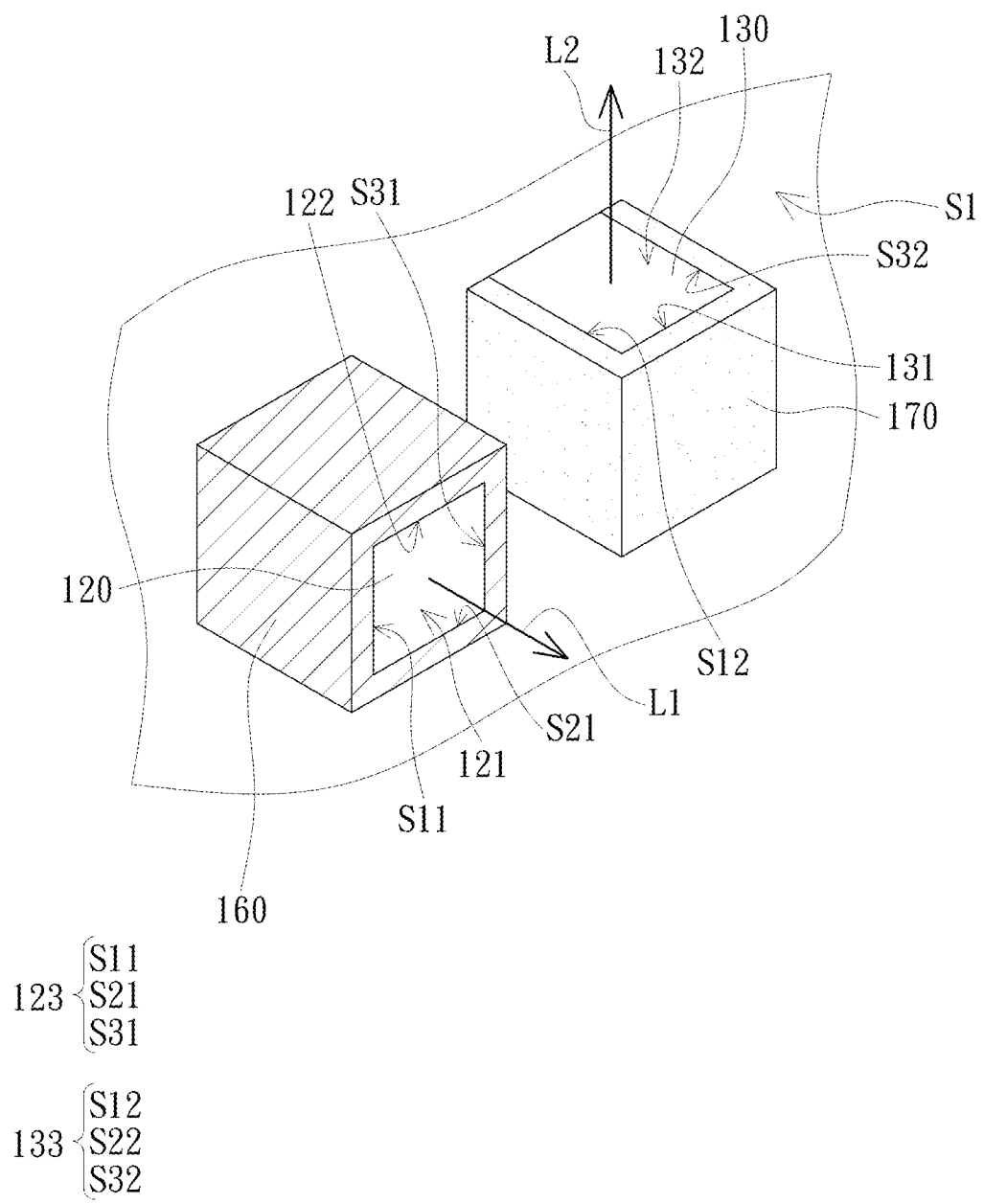
FIG. 8 is a schematic enlarged diagram of the first and second light-emitting elements in FIG. 6.
Figure 9:
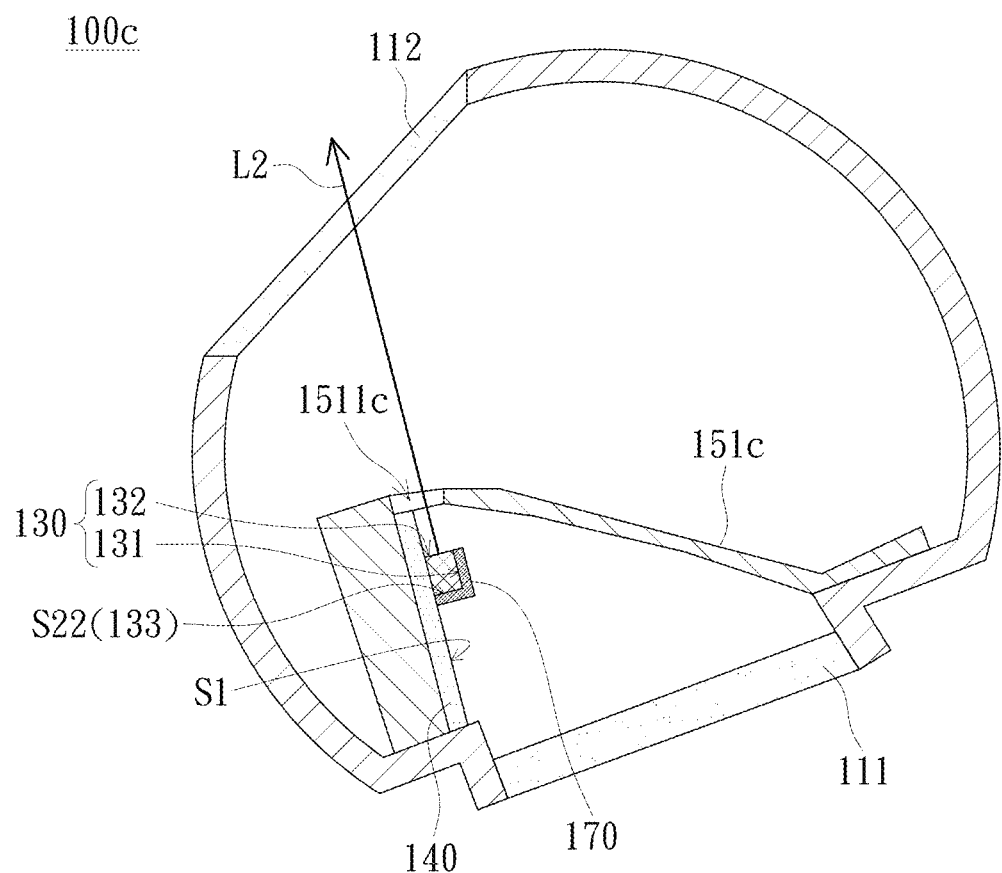
FIG. 9 is a schematic cross-sectional diagram of the illumination device shown in FIG. 6.

FIG. 6 is a schematic diagram of an illumination device in another embodiment of the disclosure. FIG. 7 is a schematic cross-sectional diagram of the illumination device shown in FIG. 6. FIG. 8 is a schematic enlarged diagram of the first and second light-emitting elements in FIG. 6. FIG. 9 is a schematic cross-sectional diagram of the illumination device shown in FIG. 6. The structure and advantages of the illumination device 100c in this embodiment are similar to those in the embodiment of FIG. 5, and only the differences are explained below. Please refer to FIGS. 6 and 7 first. The illumination device 100c further includes, for example, a first light-shading portion 160. The light-transmitting portion 1511c further extends between the first light-emitting element 120 and the second light-outlet portion 112 of the housing 110. The first light-emitting element 120 has a first top surface 121 and a first side surface 122. The first top surface 121 faces away from the first surface S1 of the substrate 140 and faces the first plate body 151c. The first beam L1 will only be emitted from the first top surface 121. The first side surface 122 is located between the first top surface 121 and the first surface S1 and faces the light-transmitting portion 1511c. The first light-shading portion 160 covers the first side surface 122 to further avoid the possibility of the first beam L1 emitted from the first top surface 121 being transmitted to the light-transmitting portion 1511c. In this embodiment, the light-transmitting portion 1511c includes, for example, a gap located between the first plate body 151c and the second plate body 152, but the disclosure does not impose any further limitations on the shape of the light-transmitting portion 1511c.

On the other hand, please refer to FIGS. 7 and 8. The first light-emitting element 120 of this embodiment further has a first side-annular surface 123. The first side-annular surface 123 is located between the first surface S1 and the first top surface 121 and is connected to the first side surface 122. In other words, the surface between the first top surface 121 of the first light-emitting element 120 and the opposite surface of the first top surface 121 can be composed of the first side surface 122 and the first side-annular surface 123. The first light-shading portion 160 can also cover the first side-annular surface 123, so that the path of the first beam L1 emitted from the first top surface 121 to the reflective surface RSb of the first plate body 151c can be more consistent, and there will be no situation where the first beam L1 emitted from the first top surface 121 is directly transmitted to the first light-outlet portion 111 without passing through the reflective surface RSb. The first side-annular surface 123 of this embodiment includes, for example, three surfaces S11, S21, and S31 of the first light-emitting element 120, but the disclosure is not limited to this.

Please refer to FIGS. 6, 8, and 9. Similarly, the illumination device 100c further includes, for example, a second light-shading portion 170. The second light-emitting element 130 has a second top surface 131 and a second side surface 132 (as the side surface SS1 shown in FIG. 5) connected to each other. The second top surface 131 faces away from the first surface S1 and faces the first plate body 151c. The second light-shading portion 170 covers the second top surface 131. The second side surface 132 is located between the second top surface 131 and the first surface S1 and faces the light-transmitting portion 1511c. The second beam L2 will only be emitted from the second side surface 132. In addition, please refer to FIGS. 8 and 9. The second light-emitting element 130 further has a second side-annular surface 133. The second side-annular surface 133 is located between the first surface S1 and the second top surface 131 and is connected to the second side surface 132. In other words, the surface between the second top surface 131 of the second light-emitting element 130 and the opposite surface of the second top surface 131 can be composed of the second side surface 132 and the second side-annular surface 133. The second light-shading portion 170 can also cover the second side-annular surface 133. The purpose of the second light-shading portion 170 covering the second top surface 131 and the second side-annular surface 133 is to avoid the possibility of the second beam L2 transmitting to the reflective surface RSb of the first plate body 151c. The second side-annular surface 133 of this embodiment includes, for example, the three surfaces S12, S22, and S32 of the second light-emitting element 130. In another embodiment, the first light-shading portion 160 and the second light-shading portion 170 in FIG. 6 can also be provided in the illumination device 100b of FIG. 5.

Figure 10:
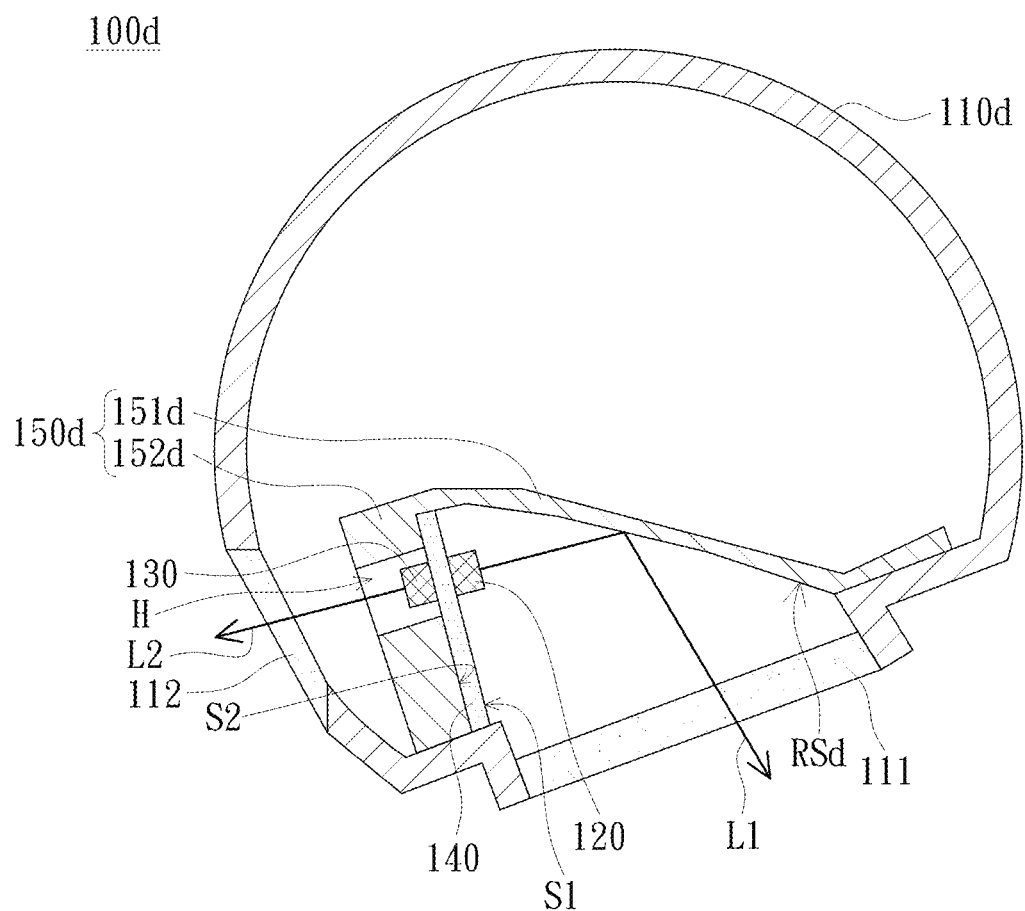
FIG. 10 is a schematic diagram of an illumination device in another embodiment of the disclosure.

FIG. 10 is a schematic diagram of an illumination device in another embodiment of the disclosure. The structure and advantages of the illumination device 100d in this embodiment are similar to those in the embodiment of FIG. 1, and only the differences are explained below. Please refer to FIG. 10. The substrate 140 is disposed on the side of the second plate body 152d facing the first plate body 151d. The substrate 140 has a first surface S1 and a second surface S2 opposite to each other. The first surface S1 faces the first plate body 151d of the reflector 150d, while the second surface S2 faces the second plate body 152d. The first light-emitting element 120 is fixed on the first surface S1. The second light-emitting element 130 is fixed on the second surface S2 and accommodated in the through-hole H of the second plate body 152d. In detail, the substrate 140 includes, for example, a double-sided printed circuit board. The first light-emitting element 120 and the second light-emitting element 130 can be respectively fixed on the first surface S1 and the second surface S2 through the surface mount technology (SMT) process. In addition, the second surface S2 can be fixed to the second plate body 152d and faces the second light-outlet portion 112 of the housing 110d through the through-hole H. The second light-emitting element 130 can be exposed from the second plate body 152d through the through-hole H. Furthermore, the reflective surface RSd of the first plate body 151d faces the first surface S1 and the first light-outlet portion 111. The reflective surface RSd is suitable for reflecting the first beam L1 to the first light-outlet portion 111. The second beam L2 is transmitted to the second light-outlet portion 112 through the through-hole H. Therefore, the second beam L2 emitted by the second light-emitting element 130 can be directly incident onto the second light-outlet portion 112, thereby improving the light utilization efficiency of the second beam L2.

In summary, the illumination device in this embodiment of the disclosure adopts a first light-emitting element and a second light-emitting element and guides the first beam and the second beam to respectively emit from the first light-outlet portion and the second light-outlet portion through the reflector. Therefore, because the illumination device can emit the first beam and the second beam in different directions, the first beam and/or the second beam can be provided according to different usage scenarios, thereby providing a variety of illumination modes. In addition, the illumination device of the disclosure adopts one substrate to electrically connect to the first light-emitting element and the second light-emitting element. Therefore, the illumination device saves at least one substrate, which can have the advantages of small volume, small weight, and simple structure.

The foregoing description of the preferred embodiment of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure" is not necessary limited the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. An illumination device, comprising:
a housing, having a first light-outlet portion and a second light-outlet portion separated from each other;
a first light-emitting element, disposed in the housing and suitable for emitting a first beam;
a second light-emitting element, disposed in the housing and suitable for emitting a second beam emitted from the second light-outlet portion;
a substrate, disposed in the housing and electrically connected to the first light-emitting element and the second light-emitting element; and
a reflector, disposed in the housing and located on a transmission path of the first beam, the reflector being suitable for reflecting the first beam to the first light-outlet portion, wherein the reflector has a first plate body and a second plate body, a first end of the first plate body is disposed on an inner wall of the housing, a first end of the second plate body is disposed on the inner wall of the housing, and a second end of the first plate body is connected to a second end of the second plate body;
wherein the substrate is disposed on a side of the second plate body facing the first plate body, the substrate has a first surface and a second surface opposite to each other, the first surface faces the first plate body, the second surface faces the second plate body, the first light-emitting element is fixed on the first surface, the second light-emitting element is fixed on the second surface and accommodated in a through-hole of the second plate body.

2. The illumination device according to claim 1, wherein the substrate is disposed on a side of the second plate body facing the first plate body, the substrate has a first surface facing the first plate body, and the first light-emitting element and the second light-emitting element are fixed on the first surface.

3. The illumination device according to claim 2, wherein the first plate body has a reflective surface, a back surface, a light-transmitting portion, and a reflective portion, the reflective surface is opposite to the back surface and faces the first surface and the first light-outlet portion, the light-transmitting portion is communicated with the reflective surface and the back surface, the reflective portion stands on the back surface and is adjacent to the light-transmitting portion, the reflective surface is suitable for reflecting the first beam to the first light-outlet portion, the second beam is transmitted to the reflective portion through the light-transmitting portion, and the reflective portion is suitable for reflecting the second beam to the second light-outlet portion.

4. The illumination device according to claim 3, wherein the first surface has a normal direction pointing towards the first plate body, the second light-emitting element is aligned with the light-transmitting portion in the normal direction, and the first light-emitting element is misaligned with the light-transmitting portion in the normal direction.

5. The illumination device according to claim 3, wherein the light-transmitting portion comprises a through hole.

6. The illumination device according to claim 3, wherein the first plate body and the reflective portion form an integrated structure or a separated structure.

7. The illumination device according to claim 2, wherein:
the first plate body has a reflective surface, a back surface, and a light-transmitting portion, the reflective surface is opposite to the back surface, the reflective surface faces the first surface and the first light-outlet portion, the light-transmitting portion is communicated with the reflective surface and the back surface, the light-transmitting portion is located between the second light-emitting element and the second light-outlet portion, and the light-transmitting portion is located on a transmission path of the second beam;
the reflective surface is suitable for reflecting the first beam to the first light-outlet portion, and the second beam is transmitted to the second light-outlet portion via the light-transmitting portion.

8. The illumination device according to claim 7, further comprising a first light-shielding portion, wherein the light-transmitting portion further extends between the first light-emitting element and the second light-outlet portion, the first light-emitting element has a first top surface and a first side surface, the first top surface faces away from the first surface and faces the first plate body, the first top surface is suitable for emitting the first beam, the first side surface is located between the first top surface and the first surface and faces the light-transmitting portion, and the first light-shielding portion covers the first side surface.

9. The illumination device according to claim 8, wherein the first light-emitting element further has a first side-annular surface, the first side-annular surface is located between the first surface and the first top surface and connected to the first side surface, and the first light-shading portion further covers the first side-annular surface.

10. The illumination device according to claim 7, further comprising a second light-shading portion, wherein the second light-emitting element has a second top surface and a second side surface connected to each other, the second top surface faces away from the first surface and faces the first plate body, the second light-shading portion covers the second top surface, the second side surface is located between the second top surface and the first surface and faces the light-transmitting portion, and the second side surface is suitable for emitting the second beam.

11. The illumination device according to claim 10, wherein the second light-emitting element further has a second side-annular surface, the second side-annular surface is located between the first surface and the second top surface and connected to the second side surface, and the second light-shading portion further covers the second side-annular surface.

12. The illumination device according to claim 1, wherein the first plate body has a reflective surface, the reflective surface faces the first surface and the first light-outlet portion, the reflective surface is suitable for reflecting the first beam to the first light-outlet portion, and the second beam is transmitted to the second light-outlet portion through the through-hole of the second plate body.

13. The illumination device according to claim 1, wherein the first beam and the second beam have different colors.

* * * * *